Nov. 25, 1969    M. G. WILHELM    3,480,057
METHOD AND APPARATUS FOR PEELING FRUITS AND
VEGETABLES UNDER LOW MOISTURE CONDITIONS
Filed April 18, 1967    2 Sheets-Sheet 1
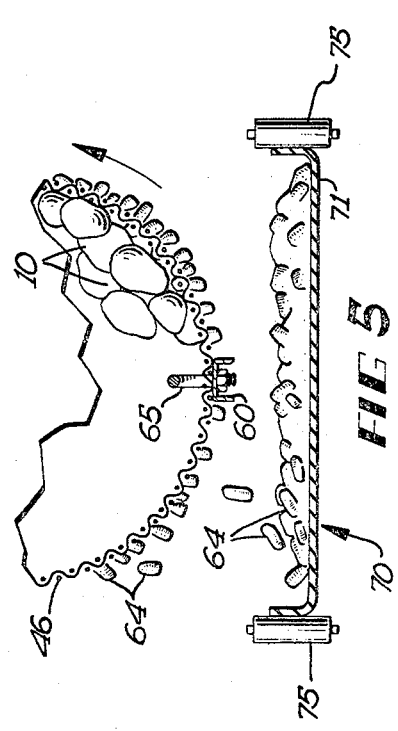
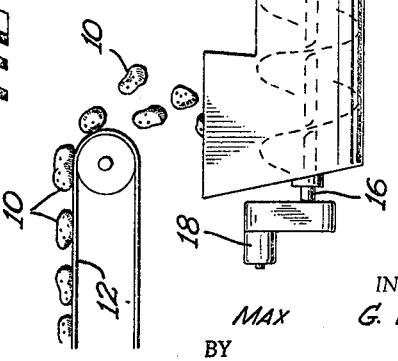
INVENTOR.
MAX G. WILHELM
BY
James V. Harmon
ATTORNEY Nov. 25, 1969     M. G. WILHELM     3,480,057
METHOD AND APPARATUS FOR PEELING FRUITS AND
VEGETABLES UNDER LOW MOISTURE CONDITIONS
Filed April 18, 1967     2 Sheets-Sheet 2

INVENTOR.
MAX G. WILHELM
BY
James V. Harmon
ATTORNEY

United States Patent Office 3,480,057
Patented Nov. 25, 1969

3,480,057
METHOD AND APPARATUS FOR PEELING FRUITS AND VEGETABLES UNDER LOW MOISTURE CONDITIONS
Max G. Wilhelm, Minneapolis, Minn., assignor to The Pillsbury Company, Minneapolis, Minn., a corporation of Delaware
Filed Apr. 18, 1967, Ser. No. 631,698
Int. Cl. B02b 1/04; A23n 7/00
U.S. Cl. 146—231                                             24 Claims

ABSTRACT OF THE DISCLOSURE

Method and apparatus for removing peelings from fruits and vegetables under low moisture conditions in order to reduce river pollution. Surfaces of food products are first softened conventionally, then drained and caused to slide across an abradant surface, e.g. woven screen, perforated metal, with frictional contact causing the surface layer to be removed in paste form. Apparatus includes hollow rotating cylinder composed of perforate material such as woven screen and a conveyor positioned to receive the paste as it falls through the openings in the screen.

---

The present invention relates to the food industry and more particularly to an improved method and apparatus for removing peels from fruits and vegetables under semi-dry conditions.

The pollution of streams and rivers is such a serious problem that in recent years it has become the focus of national attention. In some cases pollution is due in part to material introduced into streams from food processing plants. In the case of a fruit or vegetable peeling process, it is not uncommon to expel thousands of gallons of water per day containing as much as .75% solids composed of cellular material which has been removed from the surfaces of the food products being processed and often a chemical treating agent such as sodium hydroxide. Since both of these materials are difficult to economically remove from the waste water, it is ordinarily expelled directly into a stream or river without any further treatment.

In accordance with the present invention, from about 75–90% of the peeling material is removed in the form of a semi-dry paste-like sludge which can be disposed of as a solid waste material and need not be expelled into a stream. The invention has proved extremely effective in reducing the amount of waste water produced for example in a potato peeling operation. In one operation, a quantity of 75 gallons per minute containing 10.5 lbs. per minute total solids was reduced by using the present invention to the amount of 35 gallons per minute containing only 1.5 lbs. per minute of solids.

The major objectives of the invention are to provide an improved peeling method and apparatus for potatoes and other vegetables as well as fruits having the following characteristics and advantages: (a) a processing cost which does not substantially exceed that of conventional peeling operations; (b) the ability to process food materials without damaging their surfaces; (c) a reduction of water requirements to as little as 50% of the volume previously required; (d) the production of a sludge material which is sufficiently dry to be handled and disposed of as a solid.

These and other more detailed and specific objects will become apparent in view of the following specification wherein:

FIGURE 1 is a flow chart illustrating the steps performed in the course of the preferred form of the invention.

FIGURE 2 is a semi-diagrammatic side elevational view of an apparatus embodying the invention.

FIGURE 5 is a partial vertical transverse sectional view taken on line 5—5 of FIGURE 2.

Figure 3:
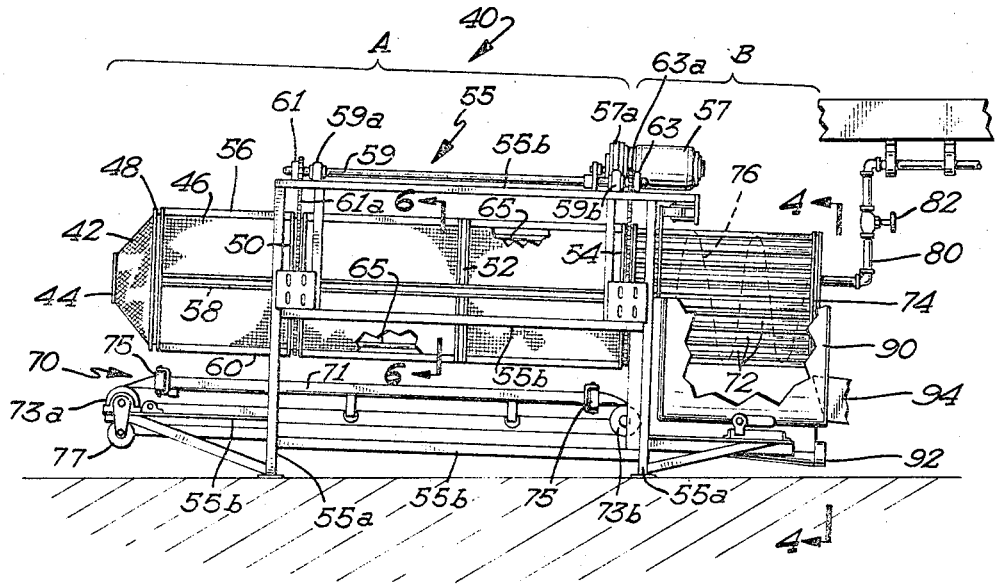
FIGURE 3 is a side elevational view of one form of peeling apparatus.

Briefly, in accordance with the present invention, the peelings are removed from food products such as tubers, root vegetables or fruit by first exposing the food products to an agency adapted to soften the cortex or peeling. Steam or conventional lye treatment can be used for this purpose. The food product being treated is then rubbed across an abradant surface having a multitude of raised members thereby smearing or wiping the softened cortex layer onto the abradant surface. The material that is removed has a paste-like consistency. The abradant surface is preferably provided with apertures for receiving the paste-like sludge. The paste-like material is then removed from the abradant surface is undiluted form and is suitably disposed of as a solid material. The food products being treated are then preferably washed briefly with a relatively small volume of water which can be applied in the form of a high pressure jet. This will remove remaining traces of softened tissue and softening agent in the event any is present.

The process is applicable to a wide variety of food products, the primary ones being potatoes, root vegetables such as sweet potatoes, rutabagas, parsnips, beets, turnips and carrots as well as fruits such as peaches and pears.

Refer now to the figures which illustrate the invention by way of example in connection with the peeling of potatoes. It will be understood, however, that the invention can be applied generally to any of the food products discussed hereinabove. As a first step in the process, the potatoes 10 that are being treated are delivered in any convenient way, in this case by means of a conveyor belt 12, to a processing receptacle such as a horizontally disposed tubular tank 14 containing an auger 16 suitably driven as by motor 18 for conveying the potatoes from left to right through the tank 14. The tank 14 contains an agency adapted to soften the cortex of the potatoes. This agency can comprise any of those known in the art for accomplishing this purpose. Steam or a lye solution as well as other treating agents are suitable for this purpose. A lye solution 20 having a concentration of about 15–20% solids is suitable.

The speed of the motor 18 and auger 16 is suitably regulated to keep the potatoes 10 and the tank 14 for the proper length of time required to soften the peeling. When a 20% solution of sodium hydroxide maintained at 180° F. is employed, the potatoes should remain in the tank 14 for about 3 minutes. During the lye treatment, the surface of the food product is softened to a depth of from about $\frac{1}{16}$ to $\frac{1}{8}$ inch in thickness. As soon as the potatoes have been passed through the tank 14, they are engaged by an endless inclined slat conveyor 24 entrained over a pair of rolls 26 and 28 provided with a series of longitudinally spaced transversely extending slat members 30 which engage the potatoes 10 and carry them out of the tank. When the potatoes pass over the roll 28, they are dumped into a peeling cylinder 40 in accordance with the invention which will now be described.

The cylinder 40 comprises two rigidly associated horizontally disposed aligned cylindrical sections designated A and B. Section A serves a peeling function and section B a washing function. The peeling section A is composed of frusto-conical abradant surface 42 having an opening 44 in the end adjacent the conveyor 24 through which the potatoes enter and a cylindrical abradant surface 46. The screens 42 and 46 can comprise any of a variety of materials such as woven strands, punched sheets, expanded metal and the like. In the event woven screens are employed, screens formed from double-crimp, heavy black iron wire having a diameter of .148 inch for openings ¾ inch square performed satisfactorily.

The screen 46 is formed into a cylindrical enclosure and is rigidified by four longitudinally spaced circumferentially extending circular channels 48, 50, 52 and 54. These channels are suitably rigidly secured to the screen 46 in any convenient way as by welding. Rigidly connected between the circular channels are four longitudinally extending circumferentially spaced parallel supporting channels 56, 58, 60 and 62, each of which is divided into three sections which are welded at their ends to one of the circular channels. The channels 48–62 comprise a support structure for the abradant surface defined by the screens 42 and 46. The channels 48–62 are relatively narrow in width, preferably no more than about 3 inches wide to avoid the presence of relatively large imperforate areas adjacent to the outside surface of the screen 46 which might interfere with the free flow of paste through the screen.

The cylinder 40 is mounted for rotation and is supported by means of a suspending framework 55 composed of a plurality of rigidly connected posts 55a and cross members 55b. The suspending framework 55 has mounted on its a drive motor 57 which is coupled through a speed reducer 57a to a horizontal drive shaft 59 journalled for rotation in bearings 59a and 59b. The drive shaft 59 has mounted on it a pair of longitudinally spaced sprockets 61 and 63 over which are entrained endless chains 61a and 63a respectively. These chains are in turn entrained within the channels 50 and 54 respectively. They serve to support the entire cylinder (sections A and B) as well as imparting rotation thereto. The cylinder is mounted on a slightly inclined axis with the open end 44 elevated slightly above the opposite end. Accordingly, the potatoes fed in through the openings 44 will gradually progress from left to right as seen in the figure first through section A and then through section B.

Mounted rigidly within the enclosure in the peeling section A are a plurality of longitudinally extending, parallel, circumferentially spaced, identical tumbling bars 65. During rotation of cylinder 40, the tumbling bars 65 function to elevate the potatoes in groups until they are substantially above the lowermost portion of the enclosure. They then tumble and slide downwardly against and across the inside surface of the screen 46 and as they do so the paste-like surface layer is removed. The tumbling bars 65 are preferably spaced from the screen 46 as shown best in FIGURE 5. Accordingly, no corners are formed in which undesired deposits of paste-like material can accumulate. The presence of such deposits, if allowed to form, could produce unsanitary conditions as well as interfering with the removal of additional material from the freshly introduced potatoes. It can be seen that during operation, the tumbling bars 65 will elevate and mix groups of potatoes two times for each revolution of the enclosure. Accordingly, it will be unlikely for the potatoes elevated by one tumbling bar to land on another tumbling bar.

During operation, the potatoes which enter the peeling section A are elevated and tumbled therein as the cylinder rotates thereby rubbing the potatoes against one another and against the abradant surface so as to wipe or smear the paste-like surface layer from the surface of the potato. At the time the potatoes enter the peeling section A, they are fairly well drained and contain only a small amount of added moisture. The abradant surface (section A) is maintained out of contact with water except for minor amounts clinging to the potatoes being introduced. Accordingly, the sludge designated 64 in FIGURE 5 is characterized by having the consistency of a paste. When potatoes are being processed, about 20 pounds of this semi-dry paste-like sludge is removed for each 100 pounds of wet lye-dipped potatoes entering section A. This sludge contains about 4 pounds of potato solids of which about 2% is sodium hydroxide.

As the paste-like material is rubbed against the abradant surface 46, the accumulated sludge begins to exude through the openings in the abradant surface 46. This sludge 64 will remain on the surface of the peeling section until pieces begin to fall of their own weight. The openings between the wires of the woven screens acting together with gravity can be thought of as a means for removing the paste-like sludge from the abradant surface in undiluted form. The pieces falling from the rotating enclosure drop onto an endless collecting conveyor 70 which will be described more fully below.

It should be understood that the abradant surface defined by the screens 42–46 performs two simultaneous functions. First, it removes the paste-like material from the surface of the potatoes without the material being diluted by water or other liquid. Secondly, it disposes of the paste-like material without the formation of undesired accumulations or deposits on the abradant surface which, if allowed to form, would interfere with the removal of the peelings after the machine had been operating for a time.

The washing section B (FIGURE 3) is made up of a plurality of longitudinally extending circumferentially spaced parallel members 72, in this case angle irons having narrow spaces between them. While the spaces can vary widely, I found that ⅛ inch openings are satisfactory. The angle irons 72 are welded at one end to the channel 54 and at their opposite end to a similar channel 74. Rigidly secured to the inward portion of the angle irons 72 as by welding is a helical flight 76 which assists in conveying the potatoes from left to right as the cylinder rotates.

Figure 4:
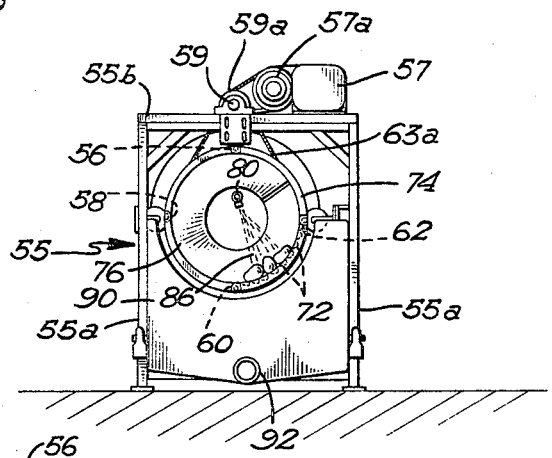
FIGURE 4 is an end elevational view taken on line 4—4 of FIGURE 3.
Figure 6:
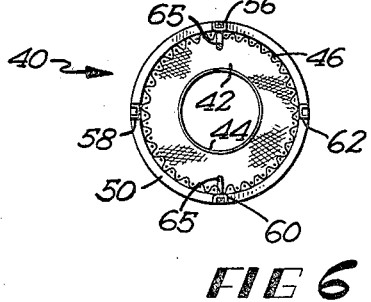
FIGURE 6 is a partial transverse sectional view taken on line 6—6 of FIGURE 3.

Wash water is supplied to the washing section B through a pipe 80, the flow rate being controlled by means of a shut-off valve 82. Connected to the pipe 80 are a plurality of longitudinally spaced spray nozzles 84 (FIGURE 2) of any suitable construction. The nozzles 84 are oriented to spray water downwardly under pressure as a directed stream 86 (FIGURE 4) onto the potatoes supported by the members 72.

Mounted on the framework 55 beneath the washing section B is a shroud 90 composed of three vertically disposed side walls and a bottom wall to which is connected a drain outlet 92 for the purpose of receiving and carrying away the wash water introduced through line 80.

A relatively small volume of water is admitted through line 80 by comparison with the volume of water previously employed. Thus, where it was prior practice to employ as much as 400 pounds of water for every 100 pounds of potatoes being processed, in accordance with the present invention, from about 10–200 and preferably about 120 pounds of water are used for each 100 pounds of potatoes being processed. This 120 pounds of rinse water will contain about 0.5 pound to about 1.2 pounds of dry potato solids. Accordingly, from about 75–90% of the removable peeling material which has been softened in the lye bath is removed in the form of a paste.

The conveyor 70 is supported upon the framework 55 and comprises an endless belt 71 entrained between a pair of transversely extending horizontally disposed rolls 73a and 73b. A plurality of identical edge support rolls 75 are positioned adjacent the top reach of the edges of the belt 71 for supporting the marginal portions in a vertically disposed position best seen in FIGURE 5 to prevent the sludge 64 from being spilled over the side of the belt. The belt is driven in any suitable manner as by means of a motor 77.

When the potatoes have passed through the washing section B, they will fall from the right end of the cylinder as seen in FIGURES 2 and 3 into a receptacle or chute 94 which is used for conveying them to subsequent processing or packaging equipment.

It should be noted that by providing a conical screen 42 no solid or imperforate surfaces are needed at the end of the drum 40. As a result, undesired deposits of paste at the left end of the drum are effectively prevented.

EXAMPLE I

Field run white potatoes are processed in accordance with the invention in an apparatus of the type described in FIGURES 1–6 in which the drum including sections A and B had a length of 14 feet 10 inches and a diameter of 32 inches. The housing is rotated at a speed of 15 r.p.m. The potatoes are first dipped in a 15% by weight solution of sodium hydroxide at a temperature of 180° F. Two hundred and twenty-five pounds of potatoes are introduced per minute. Forty-five pounds are removed in the form of sludge and solids suspended in the wash water. Wash water is employed at the rate of about 30 gallons per minute. About 80–90% of the solids removed will be in the form of sludge, the remaining 10–20% will be present in the form of solids suspended in the wash water. About 0.5 pound of dry solids will be present in each 100 pounds of wash water introduced through the line 80. Accordingly, the wash water collected in duct 92 will consist of from .5 to 1% solids.

In a second run at 20 rpm., after 10 seconds about 8% of the original material will be removed from the surface of the potato. After about 20 seconds, 15% of the original material is removed. After about 40 seconds 21% is removed. After 60 seconds about 22% is removed.

EXAMPLE II

Sweet potatoes are processed as described in Example I.

EXAMPLE III

Rutabagas are processed as described in Example I.

EXAMPLE IV

Beets are processed as described in Example I.

EXAMPLE V

Carrots are processed as described in Example I.

EXAMPLE VI

Parsnips are processed as described in Example I.

EXAMPLE VII

Turnips are processed as described in Example I.

EXAMPLE VIII

Pears are processed as described in Example I.

EXAMPLE IX

Peaches are processed as described in Example I.

It is apparent that many modifications and variations of this invention as hereinbefore set forth may be made without departing from the spirit and scope thereof.

I claim:

1. An apparatus for removing the peelings from food products, said apparatus comprising in combination a means for contacting the food products with an agency for softening the cortex thereof to enable the peelings to be removed, an abradant surface having a plurality of spaced apart members to remove the softened cortex layer from the food product when the food product is passed thereacross, said abradant surface being maintained out of contact with water, a means for sliding the food products across the abradant surface, said abradant surface having a first zone at which the food products are located and a second zone in which the softened material collects, said second zone being spaced from said first zone, and a collecting means communicating with the abradant surface to receive the peelings passing from the second zone in substantially undiluted semi-solid paste form.

2. The apparatus according to claim 1 wherein a means is provided for exposing the food products to a washing liquid to remove remaining traces of softened material from the exposed surfaces thereof following contact between the food products and the abradant surface.

3. The apparatus according to claim 1 wherein the abradant surface comprises a woven screen.

4. The apparatus according to claim 1 wherein the abradant surface comprises a hollow cylindrical enclosure and a means is provided for rotating the enclosure on its major axis.

5. The apparatus according to claim 4 wherein a plurality of circumferentially spaced longitudinally extending tumbling bars are provided within the cylindrical enclosure for elevating the food products as the enclosure is rotated on its major axis.

6. The apparatus according to claim 1 wherein a means is provided below the abradant surface for receiving the paste-like sludge material in substantially undiluted form, said receiving means comprising a conveyor positioned to receive the paste-like material as it drops from the abradant surface.

7. The apparatus according to claim 1 wherein the means for softening the cortex of the food product comprises a tank and a quantity of a caustic material contained therein.

8. The apparatus according to claim 2 wherein the means for exposing the potatoes to a washing liquid comprises an apertured enclosure and a means for spraying a liquid on the products within the apertured enclosure for removing residual softened material from the food products.

9. The apparatus according to claim 1 wherein the abradant surface comprises a generally horizontally disposed hollow cylindrical enclosure having a frusto-conical portion at the end thereof adapted to receive the food products.

10. A process for removing the peelings from food products selected from the group consisting of tubers, root vegetables and fruits, said method comprising exposing the food products to an agency adapted to soften the cortex thereof, providing an abradant surface, sliding the food products across the abradant surface to thereby smear the softened cortex material from the surface thereof onto the abradant surface to thereby remove the softened surface layer from said food products, maintaining the abradant surface out of contact with liquids during operation and removing the softened material from the abradant surface in substantially undiluted paste form.

11. The process of claim 10 wherein at least a portion of the softened material remaining on the food product is thereafter removed.

12. The process according to claim 10 wherein said agency comprises an aqueous solution of sodium hydroxide.

13. The process according to claim 10 wherein the potatoes are exposed to a solution of sodium hydroxide of from about 15–20% solids content for a period of about 1–5 minutes.

14. The process according to claim 10 wherein the abradant surface comprises a cylindrical enclosure having a plurality of openings therein and the cylindrical enclosure is rotated at a speed adapted to cause the food products to tumble about within the enclosure across the inside of said abradant surface.

15. The process according to claim 10 wherein the food products are periodically engaged and elevated and are then allowed to slide under the influence of gravity across the abradant surface and resulting frictional contact between the surfaces of the food products and the abradant surface is adapted to wipe the cortex from the food product in a substantially unidluted paste form.

16. The process according to claim 10 wherein the residual paste-like material on the surface of the potatoes is removed by exposing the potatoes to a high-pressure stream of water.

17. A process for removing peelings from raw food products such as fruits, root vegetables or potatoes, said process comprising exposing the products to an agency adapted to soften the cortex sufficiently to enable the cortex to be removed, providing a substantially horizontally disposed hollow enclosure having an abradant surface including a multiplicity of openings therein, providing a means within the enclosure for elevating the food products and thereafter allowing said food products to slide across adjacent portions of the abradant surface to thereby wipe the softened material from the surface thereof in a substantially undiluted form, allowing the removed material to pass through the openings in the abradant surface as a paste-like mass, collecting the paste-like mass after it has passed through the openings and thereafter exposing the food product to a washing means for removing residual traces of softened material from their exposed surfaces.

18. The process according to claim 17 wherein the hollow enclosure is a cylinder rotated upon its major axis at a speed of about 5–50 r.p.m.

19. The process according to claim 17 wherein the food products are potatoes.

20. The process of claim 10 wherein said agency is steam.

21. An apparatus for removing the peelings from food products, said apparatus comprising in combination a means for contacting the food products with an agency for softening the cortex thereof to enable the peelings to be removed, an abradant surface having a plurality of spaced apart members to remove the softened cortex layer from the food product when the food product is passed thereacross, said abradant surface being maintained out of contact with water, a means for sliding the food products across the abradant surface, said abradant surface having openings between the spaced apart members to receive the softened cortex material and a collecting means communicating with the openings between the spaced apart members for receiving the softened cortex material that passes through the openings in substantially undiluted semi-solid paste form.

22. An apparatus for removing the peelings from food products, said apparatus comprising in combination a means for contacting the food products with an agency for softening the cortex thereof to enable the peelings to be removed, and abradant surface having a plurality of spaced apart members to remove the softened cortex layer from the food product when the food product is passed thereacross, said apparatus including a generally horizontally disposed cylinder having two adjacent sections including a peeling section comprising said abradant surface and a washing section rigidly connected thereto in axial alignment therewith, said peeling section comprising a cylindrical perforate surface, said washing section comprising a hollow cylindrical apertured surace and a motive power means for rotating the cylinder on its major axis, said abradant surface being maintained out of control with water, a means for sliding the food products across the abradant surface and the abradant surface being constructed to permit the removal of the softened cortex material deposited on the abradant surface in substantially diluted semi-solid paste form.

23. The apparatus according to claim 22 wherein a helical flight is rigidly mounted within the washing section for transporting the food product from one end of the washing section to the other end when the cylinder is rotated.

24. A process for removing the peelings from food products selected from the group consisting of tubers, root vegetables and fruits, said method comprising exposing the food products to an agency adapted to soften the peelings, providing an abradant surface having a first zone in which the food products are located and a second zone spaced from the first zone for collecting the softened material, transferring the soft peeling material from the first zone to the second zone, maintaining the abradant surface out of contact with liquids during operation and removing the softened material from the second zone in substantially undiluted paste form.

References Cited

UNITED STATES PATENTS

| | | | |
|---|---|---|---|
| 784,527 | 3/1905 | Vernon | 146—230 |
| 1,012,129 | 12/1911 | Fast | 146—49 |
| 1,453,781 | 5/1923 | Ash | 146—233 |
| 2,190,063 | 2/1940 | Gano | 146—231 |
| 3,016,936 | 1/1962 | Wilson et al. | 146—47 |
| 3,190,329 | 6/1965 | Bradway | 146—49 |
| 3,246,677 | 4/1966 | Hickey et al. | 146—231 |
| 3,370,627 | 2/1968 | Willard | 146—231 |

JAMES M. MEISTER, Primary Examiner

U.S. Cl. X.R.

83—49, 233